Sept. 10, 1946.    R. BIRMANN    2,407,469
ROTOR FOR ELASTIC FLUID MECHANISM
Original Filed March 26, 1943    8 Sheets-Sheet 2
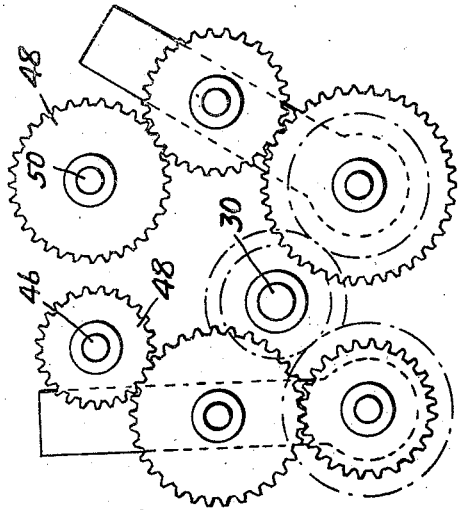
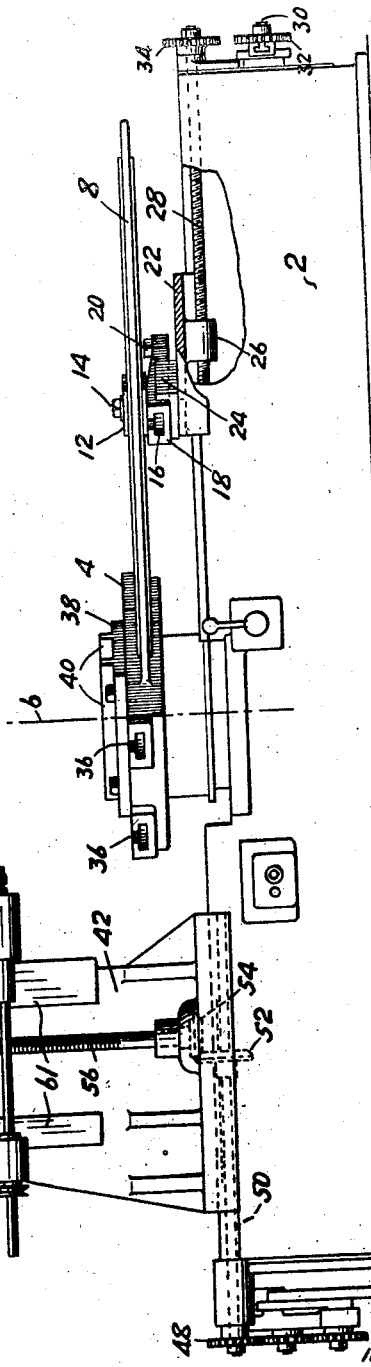
INVENTOR
Rudolph Birmann
BY
WITNESS:

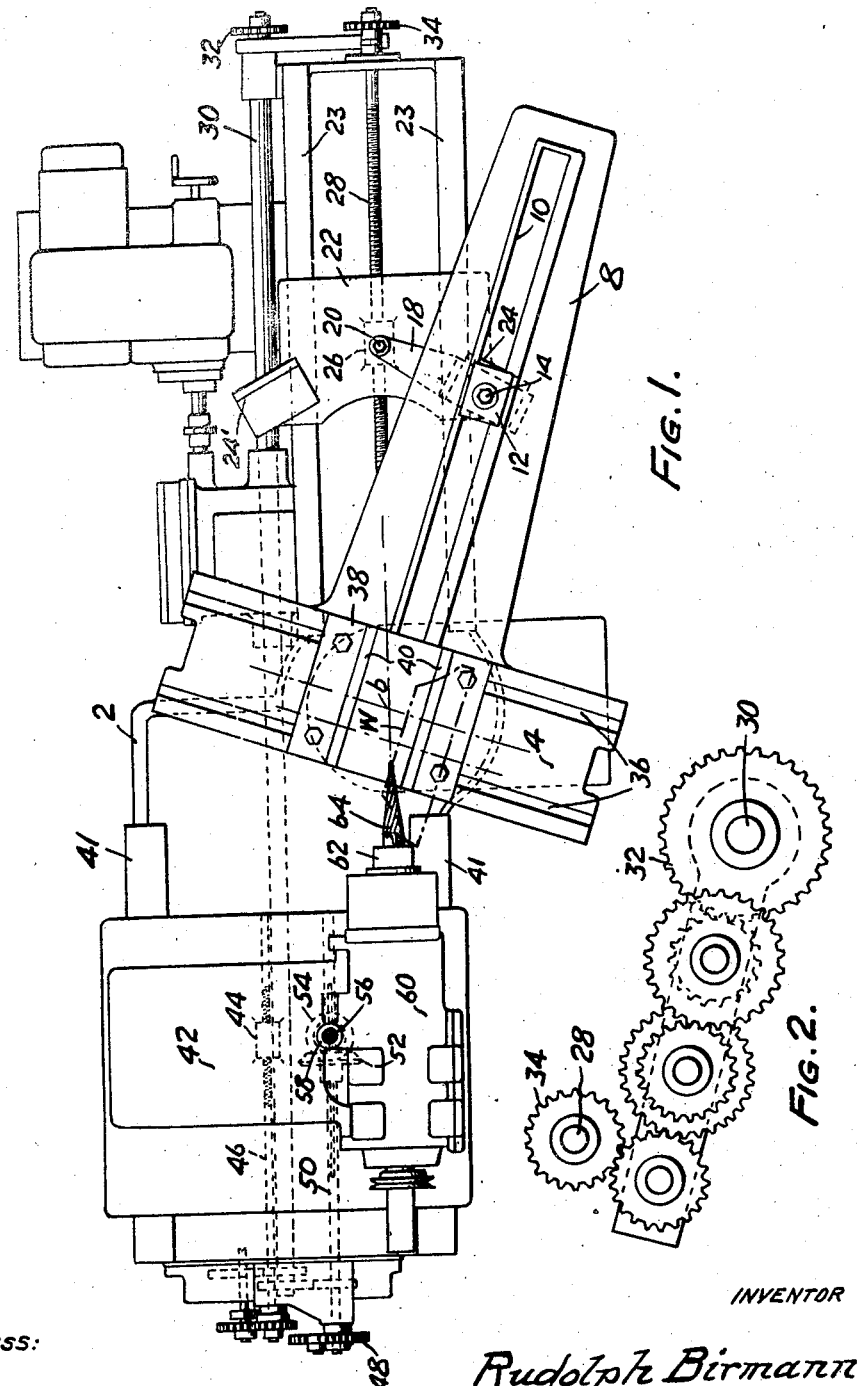

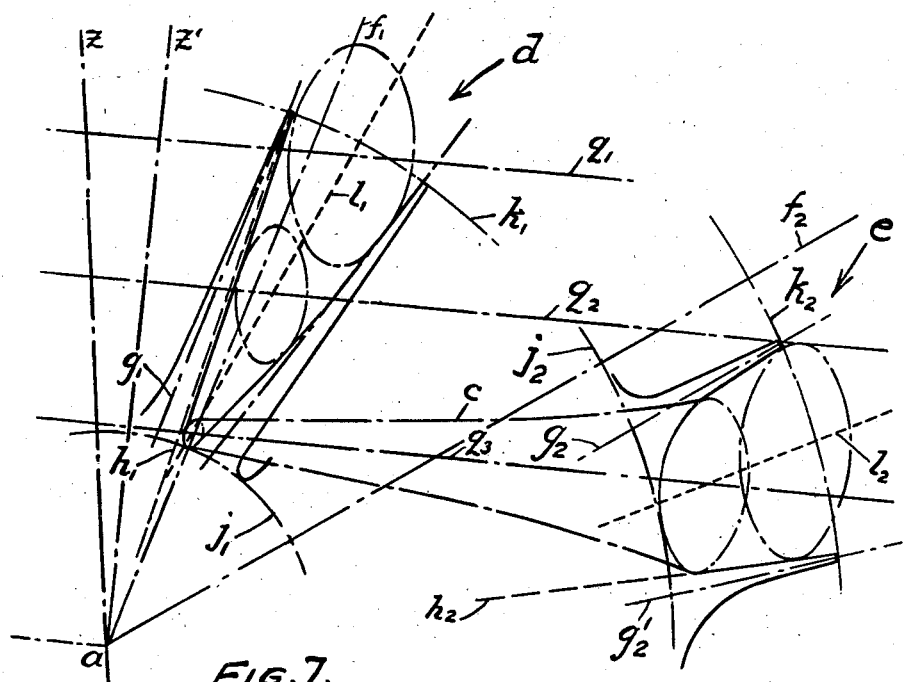
FIG. 7.
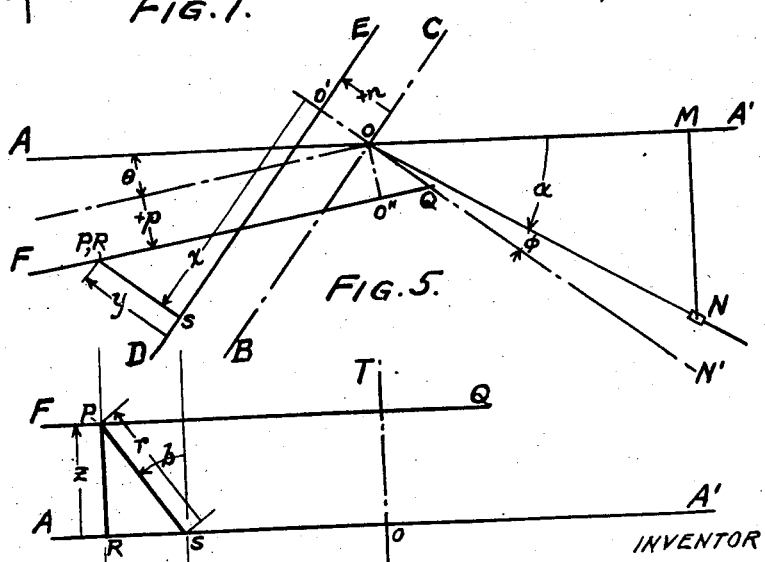
FIG. 5.
FIG. 6.
INVENTOR
Rudolph Birmann
ATTORNEYS.

Sept. 10, 1946.                R. BIRMANN                    2,407,469
                      ROTOR FOR ELASTIC FLUID MECHANISM
               Original Filed March 26, 1943     8 Sheets-Sheet 4
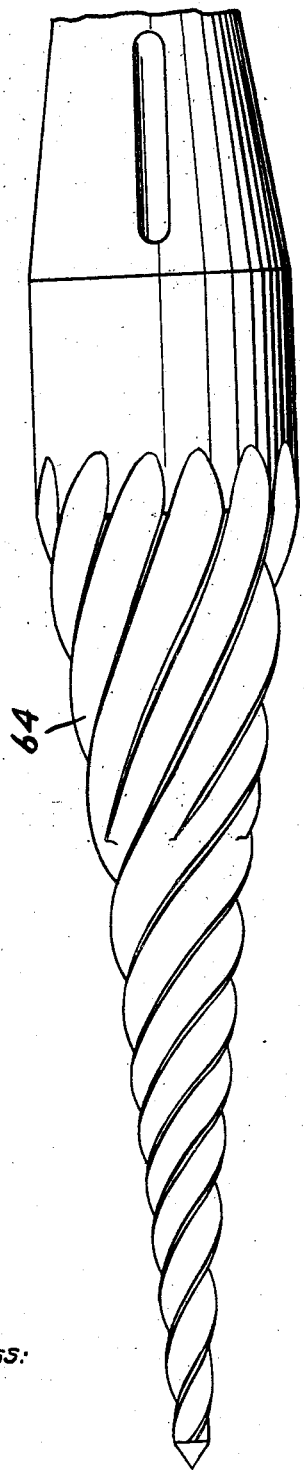
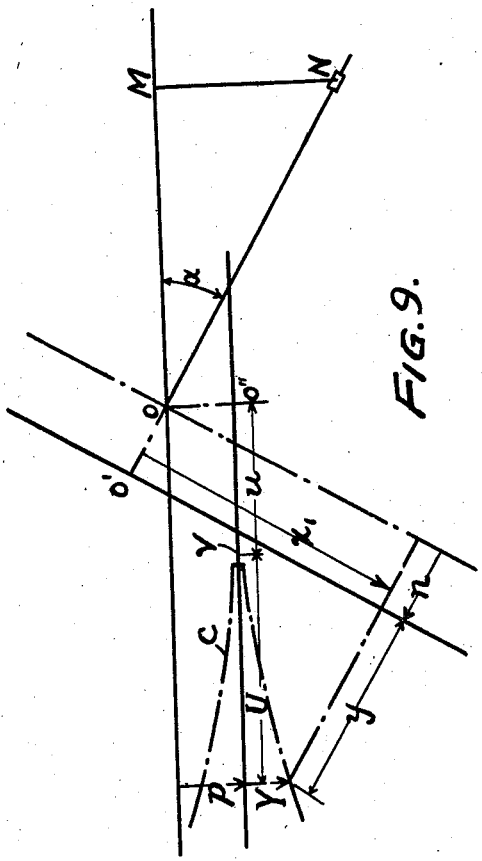
INVENTOR
Rudolph Birmann
BY
ATTORNEYS
WITNESS:

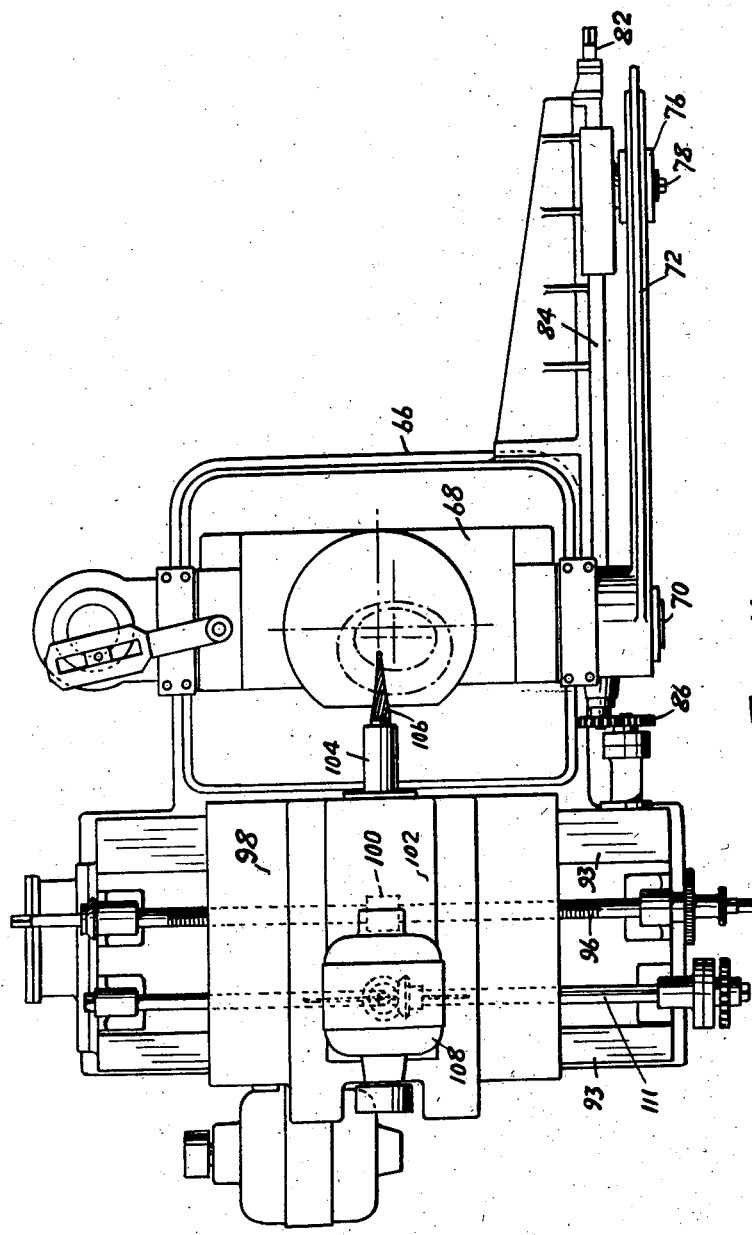

Sept. 10, 1946.　　　　R. BIRMANN　　　　2,407,469
ROTOR FOR ELASTIC FLUID MECHANISM
Original Filed March 26, 1943　　8 Sheets-Sheet 7

INVENTOR
Rudolph Birmann
BY
ATTORNEYS.

Sept. 10, 1946.  R. BIRMANN  2,407,469
ROTOR FOR ELASTIC FLUID MECHANISM
Original Filed March 26, 1943  8 Sheets-Sheet 8

INVENTOR
Rudolph Birmann
BY
ATTORNEYS.

WITNESS:

Patented Sept. 10, 1946

2,407,469

UNITED STATES PATENT OFFICE 2,407,469

ROTOR FOR ELASTIC FLUID MECHANISM

Rudolph Birmann, Newtown, Pa., assignor, by mesne assignments, to Federal Reserve Bank of Philadelphia, a corporation of the United States of America Original application March 26, 1943, Serial No. 480,633. Divided and this application April 8, 1944, Serial No. 530,188

26 Claims. (Cl. 230—134)

This invention relates to improved rotors for elastic fluid mechanisms and particularly to centrifugal impellers and turbine rotors. Specifically, the invention relates to the provision of the type of rotors for elastic fluid mechanism which are disclosed in my Patents 1,926,225, dated September 12, 1933, 1,959,703, dated May 22, 1934, and 2,283,176, dated May 19, 1942. The present application is in part a continuation of my application Serial No. 441,686, filed May 4, 1942, now abandoned, and is a division of application Serial No. 480,633, filed March 26, 1943.

In particular, in my Patent 1,959,703, there is described an improved type of impeller having very marked advantages over those theretofore in use. As described in said patent, the impeller blades or vanes may be considered as built up upon surfaces containing two sets of straight line elements contributing to effect substantially straight line flow of elastic fluid relative to the impeller and great mechanical strength for high speed operation due to the fact that one set of said straight lines is radial. The blading also has the advantage that inlet angles vary properly with the radius so as to give smooth entrance throughout the vertical height of the leading edge of each blade. Various other advantages result from this construction and are described in said patent.

For very high speed operation, however, the blading as disclosed in said patent, while far more efficient than other types, has limitations in that the specific loading of the vanes is too great, or in other words, various portions of the vane surfaces are required to do too much work in accelerating the elastic fluid.

It is the one object of the present invention to adapt the impeller construction of said patent for the provision of impellers having very high efficiency at high speeds of operation. This involves lowering the specific loading to such extent that smooth flow takes place without breaking away of the flow from the passage walls with the production of burbling, or "stalling." As a result of the matters of the present invention, impellers of very small dimensions and light weight may be constructed to operate at extremely high specific speeds to produce high outputs, specific speed being equal to $$\frac{n\sqrt{Q}}{H^{\frac{3}{4}}}$$

wherein Q is the volume handled in cubic feet per minute, H is the total head produced by the impeller in feet, and n is revolutions per minute.

A further object of the present invention is the provision of improved vanes or blades for impellers or turbine rotors by the adoption of a novel method for the generation of elastic fluid rotors of the type indicated.

A further object of the invention is the provision of a centrifugal impeller wherein, without violation of other requirements, there is secured a quite large angle about the axis of rotation between the inlet and the outlet portions of each of its passages.

These and other detailed objects of the invention will become apparent from the following description, read in conjunction with the accompanying drawings, in which:

Figure 1 is a plan view of one form of machine provided in accordance with the invention for the generation of such rotors;

Figure 2 is an elevation showing certain gear change mechanism of the machine, in particular looking at the right hand end of the machine as viewed in Figure 1;

Figure 3 is an elevation of the machine of Figure 1, partially in section, to illustrate certain details;

Figure 4 is an elevation of certain gear change mechanism as viewed looking at the left hand end of Figure 3;

Figure 5 is a diagram showing in plan the principal elements of the machine of Figure 1 and serving to make clear the nature of the surfaces generated thereby;

Figure 6 is a similar diagram of the same matter in elevation;

Figure 7 is a diagrammatic elevation indicating two radial sections through an impeller formed in accordance with the invention illustrating in particular how the impeller passages are generated and the fashion in which the angle between the inlet and outlet is increased;

Figure 8 is an elevation of the type of cutter used for the generation of the passages;

Figure 9 is a view, generally similar to Figure 5, but provided in particular to illustrate the fashion in which a cutter generates both sides of an impeller passage simultaneously;

Figure 11 is a plan view of the machine of Figure 10;

Figure 10:
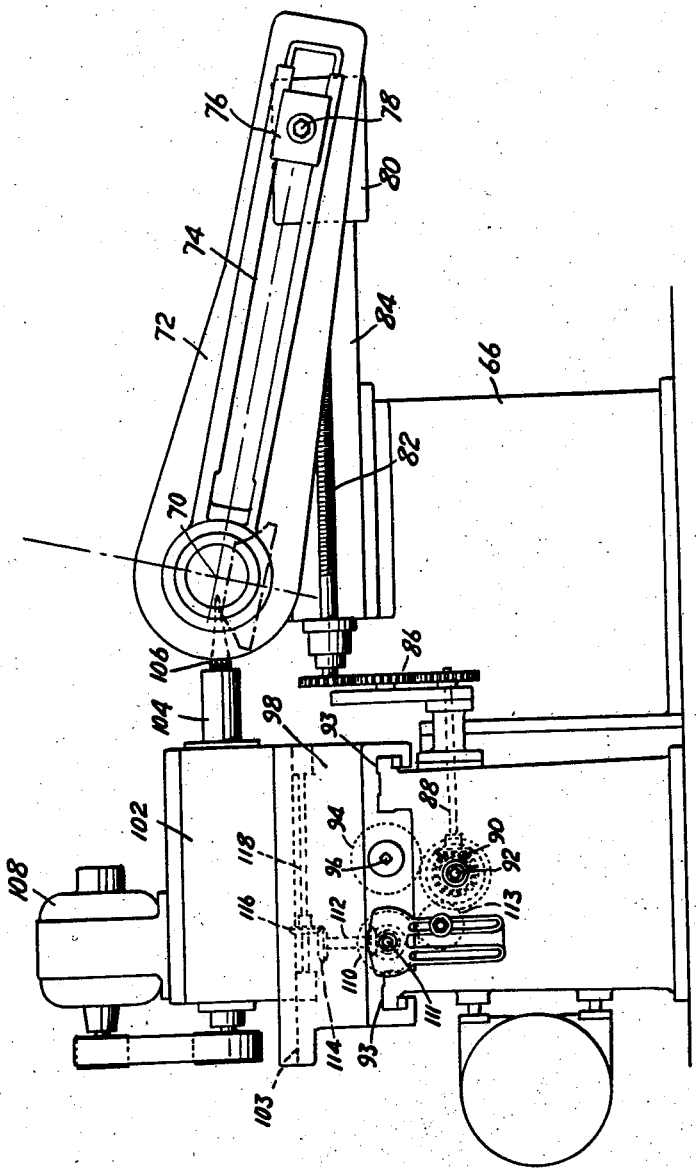
Figure 10 is a side elevation of an alternative form of machine provided in accordance with the invention.

The particular vane constructions involved will be best made clear by first considering certain improved machines for generating the vanes.

There will first be described the physical aspects of the machine of Figures 1 to 4, the nature of the operations performed thereby being thereafter described.

The machine of these figures is essentially a milling machine in which both the cutter and the work are movable in predetermined definite relationship to secure the generation of skew surfaces. The machine comprises a bed 2 on which there is mounted a work carrier 4 for rotation about a vertical axis 6, the position of which may, if desired, be made adjustable transversely of the machine. The work carrier 4 is provided with an arm 8 slotted as indicated at 10 to provide a trackway for the reception of a cross-head 12, which is pivoted, as indicated at 14, to a block adjustable along a guideway 16 extending radially of an arm 18, which is secured at 20 to a carriage 22 movable on tracks 23. The pivot 14 is arranged to be fixed in adjusted position radially of the arm 18, while the arm 18 is adapted to be swung between two positions defined by stop elements 24 and 24' at opposite sides of, and secured to, the carriage 22. The provision for swinging the arm 18 to either of these two positions is merely to make it easily possible to generate right hand and left hand rotors. As will become evident hereafter in discussing the theory of operation, the fact that the arm 18 extends at an acute angle with respect to the axis of the machine is not significant and, in fact, this arrangement is provided solely to make possible certain clearances when the carriage 22 reaches an extreme left hand position. The adjustment of the pin 14 is solely for the purpose of adjusting it transversely of the longitudinal axis of the machine, this adjustment alone being of interest.

The carriage 22 is provided with a nut 26 which embraces the carriage-driving screw 28, driven from the main shaft 30 of the machine through change speed gearing comprising the end elements 32 and 34 and indicated in Figure 2. The work support 4 is provided with grooves as indicated at 36, along which there may be adjusted the table 38, which in turn carries tracks 40 so that the work W may be adjusted in the direction of the tracks, i. e., in the direction of the length of the trackway 10. It will be evident from the above that the work may be adjusted both in the direction of the trackway 10 and transversely of that direction relative to the vertical axis 6 about which rotation may take place by reason of the travel of the cross-head 12 along the trackway 10. In addition, if desired, the vertical axis 6 may be adjusted transversely of the direction of the screw 28.

A carriage 42 supports the cutter and is arranged to slide in the direction of the axis of the screw 28 along the tracks 41 provided on the machine bed. A nut 44 carried by the carriage 42 embraces a screw 46, connected to a gear 48 (Figure 4) driven through change speed gearing from the main shaft 30. A shaft 50, whose gear 48 is driven through change speed gearing from the main shaft 30, as indicated in Figure 4, has splined thereto a bevel pinion 52 meshing with a second bevel pinion 54 carried by a vertical screw 56 mounted in the carriage, the bevel pinion 52 being so mounted as to move with the carriage lengthwise of the shaft 50. The vertical screw 56 is embraced by a nut 58 carried by the support 60 movable vertically relative to the carriage 42 along the trackways 61 of the latter. The support 60 has mounted in bearings therein the spindle 62 in which may be fitted the various milling cutters 64, the support also carrying the driving motor 63 for this spindle.

As a result of the construction indicated, it will be evident that the cutter is movable both in the direction of its axis of rotation, which is parallel to the tracks 41, and also vertically by reason of the mounting of its support on the tracks 61.

In Figures 5 and 6 there are illustrated diagrammaticaly the fundamental elements of the machine of Figures 1 to 4. In these Figures 5 and 6, the axis of rotation of the work is indicated at OT through which there extends the horizontal line AOA' parallel to the axis of the screw 28 and to the tracks 23. Along this line AOA' there moves the foot M of a horizontal perpendicular MN, the length of which, though subject to adjustment, is fixed during any particular operation of the machine, the point N corresponding to the pivot of the crosshead 12 arranged to slide along the line ON which may be considered fixed to the work support pivoted about OT. For the purpose of greater generality of analysis, there are involved in Figures 5 and 6 adjustments in addition to those described in connection with the physical machine. For example, DE represents the axis (horizontal) of the blank being cut which axis, however, is not perpendicular to ON but to a line ON' making with ON the angle $\phi$. BC is perpendicular to ON' and parallel to DE at a distance $n$ representing the displacement of the axis of the work from the axis OT of rotation.

FQ is the axis of the cutter, extending horizontally at a distance $z$ from the common horizontal plane of AA', ON, DE, and BC, and for generality assumed making an angle $\theta$ with the direction AA' and displaced horizontally by a distance $p$ from the axis OT.

It will be evident that Figures 5 and 6 represent the essentials of the machine with some further generality introduced by the angles $\theta$ and $\phi$ and the displacement $p$. While the physical form of the machine involves some vertical and horizontal displacements of the physical equivalents of the diagrammed lines it will be evident that what is accomplished by the machine is identically what would be accomplished by the diagrammed mechanism.

First there will be considered the theoretical surface which would be generated by a cutter of zero diameter, i. e., by the cutter axis FQ. This involves seeking an equation for an arbitrary point P on FQ in terms of coordinates tied to the work. Let PR be the perpendicular from the arbitrary point P to the plane AON, and RS the perpendicular to line DE from R. As origin consider point O' the foot of the perpendicular from O to DE, the rotor axis, and let $x$ be measured along the axis DE in the direction O'S, $y$ perpendicular to DE in a horizontal plane in the direction SR, and $z$ vertically in the direction RP. For the purpose of the present analysis, these rectangular coordinates will be most convenient. For comparison with the aforementioned patents, related cylindrical coordinates $x$, $b$, and $r$ may be noted, related to $x$, $y$, and $z$ as follows:

$$x = x$$
$$y = r \sin b \quad r = \sqrt{y^2 + z^2}$$
$$z = r \cos b \quad \tan b = \frac{y}{z}$$

by which relationships transformation from one set of coordinates to the other may be readily effected.

As will be evident from the machine, the point M moves along AA' towards the right as the cutter axis FQ moves vertically in the direction of increasing $z$ at a definite ratio of speeds determined by the change gearing. From this and the geometry of Figures 5 and 6, the equations of the surface generated are:

1. $$y = \frac{x}{\tan(\alpha + \theta + \phi)} - \frac{p}{\sin(\alpha + \theta + \phi)} - n$$
$$z = K_1\left(\frac{1}{\tan \alpha}\right) - K_2$$

These are parametric equations for the surface in terms of the parameter $\alpha$, the angle MON, which cannot be eliminated from these general equations without giving rise to a very complicated single equation.

$K_1$ in the above is the product of the length of MN by the ratio of the rate of movement of $z$ to that of point M.

If, theoretically, M reached O, $z$ would then have the value $-K_1 K_2$; in other words, $K_2$ is related to the initial relative settings of the cutter axis and point M.

It will be noted from the above equations that the angles $\theta$ and $\phi$ are additive, i. e., the same effect of adjustment of both could be secured by adjustment of one, or if they were of different signs they would tend to neutralize each other. There is, therefore, no point in setting the cutter axis FQ off parallelism with the axis AA', the same effect being securable by turning the blank on the table to change $\phi$. As a matter of fact, adjustment of $\phi$ is not generally desirable (causing the vanes generated to depart from radial condition) and hence in the following $\theta$ and $\phi$ will both be considered zero. Only under special conditions may $\theta$ and $\phi$ be introduced to advantage, for example, to correct curvatures otherwise introduced.

If $\theta + \phi = 0$, the equations reduce to:

2. $$y = \frac{x}{\tan \alpha} - \frac{p}{\sin \alpha} - n$$
$$z = K_1\left(\frac{1}{\tan \alpha} - K_2\right)$$

The adjustment of $p$ different from zero is also a disturbing factor unless it is properly related to the other constants. As will be evident from the form of these equations, radial sections of the surface ($x$=constant) are not straight lines, curvature being introduced by the constant $p$. Slight values of the constant $p$ may be used, however, without detrimental deviation from straight line values of these sections. It is also possible to use quite large values of $p$ provided the other constants are properly chosen, particularly to obtain for impellers quite large angles between the entrance and exit portions of the fluid passages.

If $p$ is zero, there are obtained the surfaces to which, and to the generation of which, the present application is primarily directed. The equations then become:

3. $$y = \frac{x}{\tan \alpha} - n$$
$$z = K_1\left(\frac{1}{\tan \alpha} - K_2\right)$$

From these the parameter may be readily eliminated giving the single equation for the surface:

4. $$\frac{z}{K_1} + K_2 = \frac{y + n}{x}$$

As will be obvious from the last equation, any radial section, $x$ constant, will be a straight line. The straight line, however, will not be radial unless $n - K_2 x = 0$. Since $x$ varies from inlet to outlet, it is possible to choose $n$ and $K_2$ so that at the inlet $n - K_2 x$ is positive whereas at the outlet, $x$ being then greater, $n - K_2 x$ is negative with both of these limiting deviations from zero small. In this fashion, advantageous results may be secured as pointed out below.

If $n = 0$ and $K_2 = 0$, the equation becomes:

5. $$x = K_1 \frac{y}{z}$$

or, changing to cylindrical coordinates, $x = K_1 \tan b$, the equation of the surface disclosed and discussed in the aforementioned patents. As will be pointed out hereafter, the surfaces generated in accordance with the present invention may conform very closely either to a single surface given by $x = K \tan b$, or to a plurality of such surfaces fitted together, the advantage arising in the latter case being that a single generation serves to provide a complete surface which would otherwise require separate successive generating operations.

The application of the above to the generation of an impeller or turbine wheel will be next described with reference to Figure 7, in which generation will be assumed in accordance with Equations 3 or 4. In this figure, $a$ indicates the axis of the wheel being generated (=DE of Figure 5) and $az$ is the trace of the $yz$ plane, the angle $b$ being measured positive in a clockwise direction and $y$ being measured horizontally to the right. The entrance portion of an impeller passage is illustrated at $d$ and the exit portion of the same passage at $e$. The former will be regarded as located at $x = x_1$, and the latter at $x = x_2$, various illustrated elements being located in said planes. It is assumed that the constants $K_1$, $K_2$ and $n$ have been set by adjustment of the machine. Preliminarily we will again consider generation of surfaces by the axis of the cutter, passing later to the effect of using a real cutter of particular type.

At $f_1$ and $f_2$ there are indicated the radial lines corresponding to the intersection of the planes $x = x_1$ and $x = x_2$ with the surface $x = K_1 \tan b$, i. e., the surface which would be generated by making $K_2$ and $n$ zero in Equations 3 or 4.

Assume further that $n$ and $K_2$ are so chosen as above so that $n-K_2x_1$ is positive and $n-K_2x_2$ is negative. The element $g_1$ of the general generated surface then, in accordance with what was proved above, lies to the left of $f_1$, parallel to $f_1$ and at a distance therefrom determined by the choice of constants and the value of $x_1$.

The element $g_2$ of the same surface lies to the right of $f_2$, parallel to $f_2$ and at a distance determined by the choice of constants and the value of $x_2$.

Obviously for some intermediate value of $x$ for which $n-K_2x=0$, the element of the generated surface will be truly radial and coincident with the element $f$ of $x=K_1 \tan b$ and the maximum deviations from radial condition will occur at $g_1$ and $g_2$. It will thus be seen that, for the indicated relation of $n$ and $K_2$, the generated surface will pass from one side of $x=K_1 \tan b$ to the other in the direction of increasing $b$ with the result that between $x_1$ and $x_2$ it will subtend a greater angle than the latter; in the diagram, for example, the latter subtends about 37°, whereas the former subtends about 47°.

This is very advantageous in reducing the loading on the blading as will be pointed out later. Surfaces built upon the theoretical surface thus generated have, however, a limitation in that the surface elements are not radial except at some intermediate position. Suppose, for example, arcs $j_1$ and $k_1$ define the inner and outer limits of vanes at the entrance plane $x=x_1$ and it is desired to construct a vane on the generated surface. If $h_1$ is a radial line drawn from the intersection of $g_1$ with arc $k_1$, it is obviously desirable that the vane material should completely encompass such radial line, and similar radial lines in all other radial sections. With $g_1$ displaced only to the extent shown from a radial direction, it is obvious that this may be readily accomplished; however, if $g_1$ were too far displaced off center, the vane to satisfy this requirement might have to be too thick at its base. As a matter of fact, the requirement is not absolutely necessary, and if a vane is of sufficient thickness, some undercutting of radial lines through it is permissible. Under such conditions, the element $g_1$ at the entrance edge might well be carried further to the left to secure a still greater angular spread of each vane from inlet to outlet.

At the discharge a similar condition arises, in this case affecting the opposite face of a vane. A radial line $h_2$ is illustrated indicating the desirable limit of approach to an element $g_2^1$ of a vane adjacent that having elements $g_1$ and $g_2$. The radial outlet limits $j_2$ and $k_2$ impose the limitations, and, as illustrated, if the radial extent of the outlet is small compared to that of the inlet, a correspondingly greater deviation of the element $g_2$ from radial condition is permissible.

As pointed out in my Patent, 1,959,703, the inlet angle of a surface $x=K \tan b$ varies precisely within the radius as required for smooth pick up of fluid being handled. It will be apparent without going into mathematical proof that the surfaces here considered, by reason of close approach to $x=K_1 \tan b$ will also be, for practical purposes, completely satisfactory in this regard, particularly so when given radial entrance edges of airfoil characteristics since such edges have fairly large tolerances for entrance angles consistent with maintenance of smooth flow. However, it is also to be noted that while the improved surface is displaced from the surface $x=K_1 \tan b$ having the same value of $K_1$, it will, in view of the necessary thickness of a real vane, conform to, and include, for a very considerable axial extent, a surface $x=K^1 \tan b$ where $K^1$ differs from $K_1$. Thus it follows that real vanes of the improved type may be said to conform to a series of surfaces $x=K \tan b$ (in most practical cases to not more than three thereof) which surfaces may be considered as smoothly merging. The advantages of the present surfaces lie primarily in their ease of generation by single cutting operations to give a large angular spacing between inlet and outlet.

The generation of real vanes of the type discussed based on the improved surfaces, results from the movement, during the generating motions indicated, of cutters of improved types along the cutter axis while it is moving in the direction PR.

The axis of a real cutter will follow a path intermediate adjacent theoretical surfaces. In Figure 7, for example, the cutter axis in moving inwardly follows a path intersecting plane $x=x_1$ along a line $l_1$, identical with $g_1$ but spaced therefrom half the angular spacing of adjacent elements $g_1$. Likewise at plane $x=x_2$, the cutter axis traces a line $l_2$ midway between $g_2$ and $g_2^1$. The fluid passages therefore lie along the same surfaces given by Equations 3 or 4 with the origin plane $xz$ displaced by half the angular spacing of the vanes to $az^1$ (Fig. 7). Thus both the vanes and passages conform to surfaces given by the equation.

In order that both surfaces of each passage may be simultaneously generated, the cutter is given a tapered shape which may be conical but which is most desirably substantially hyperboloidal as illustrated in Figure 8 at 64 and diagrammatically at $c$ in Figure 7. Referring first to the latter, sections (approximately elliptical) of the cutter are shown in the two limiting planes $x_1$ and $x_2$, to illustrate the mode of generation. As the cutter axis moves in the direction of decreasing $z$, the cutter is uniformly moved in a retracting direction from the blank in the direction QF (Figs. 5 and 6). Thus a part of large diameter first cuts the outermost entrance portions of the passages, and as retraction takes place, it proceeds to cut more inward parts of the entrance portions of the passages and portions further towards the discharge. Successive positions of the cutter axis are illustrated at $q_1$, $q_2$, and $q_3$. The position $q_3$ corresponds to the cutting of the trough of the passage.

The shape of the cutter is such that during such action the space cut, which is the envelope of the successive positions of the cutter, will be such as not to encroach (preferably) on the limiting radial lines $h_1$ and $h_2$. If the cutter has an approximately hyperboloidal shape as illustrated, the result is to generate vanes having the desirable taper for securing sufficient strength with production of fillets where the vanes join the central portion of the disc. It will be evident that the shape of the cutter is subject to substantial variation and the hyperboloidal form may be approximated by the rotation of circular arcs or even successive straight lines about the cutter axis. The actual shape depends in each instance upon the desired vane taper and whether or not undercutting of radial lines from the vane tips is permissible. The rate of retraction of the cutter is also dependent on these same factors and related to the cutter shape, as will be obvious.

In Figure 9 there are diagrammed the factors entering into the operation of the cutter $c$ in generating more general surfaces for vanes in accordance with Equations 2 involving adjustment $p$ as well as $n$ and $K_2$. Assuming that the cutter has a surface of revolution which, referred to its axis and a movable point V on the cutter axis as origin, is given in cylindrical coordinates by $R^2 = f(U)$, where U is measured along the axis of the cutter from the origin V, the cutter surface will be given by the following equation in terms of coordinates $x$, $y$, $z$, referred to the same coordinate system used above in discussing the generated surfaces:

6. $(x_1 \cos \alpha - y_1 \sin \alpha - n \sin \alpha - p)^2 +$
$$\left(z_1 - \frac{K_1}{\tan \alpha} + K_1 K_2\right)^2 =$$
$$f\left(x_1 \sin \alpha + y_1 \cos \alpha + n \cos \alpha + \frac{K_3}{\tan \alpha} - K_4\right)$$

In the above $K_1$, $K_2$, $n$, $p$, and $\alpha$ are the same as previously considered. $K_3$ and $K_4$ are constants taking into account the movement of the origin point of the cutter surface along the cutter axis, i. e., the variation of the coordinate $u$ of the origin point V. This, as evident from the description of the machine, is proportional to the movement of the point M and also to the change of $z$. $K_3$ takes into account this speed ratio while $K_4$ takes into account the starting position for the movement.

In accordance with the usual theory of envelopes, the surface given by Equation 6 will generate, for variations of parameter $\alpha$, a surface given by eliminating the parameter $\alpha$ from it and its partial derivative with respect to $\alpha$. Taking the partial derivative of 6 with respect to $\alpha$ there is obtained:

7. $2K_1 \csc^2\left(z_1 - \frac{K_1}{\tan \alpha} + K_1 K_2\right) - 2(x_1 \cos \alpha - y_1 \sin \alpha - n \sin \alpha - p)(x_1 \sin \alpha + y_1 \cos \alpha + n \cos \alpha) =$
$$(x_1 \cos \alpha - y_1 \sin \alpha - n \sin \alpha - K_3 \csc^2 \alpha) \cdot f'\left(x_1 \sin \alpha + y_1 \cos \alpha + n \cos \alpha + \frac{K_3}{\tan \alpha} - K_4\right)$$

wherein $f'$ is the first derivative of the function $f$ with respect to its argument.

The solution of Equations 6 and 7 to eliminate $\alpha$ is laborious, even though performed graphically, but the cross-section of a passage may be thus accurately ascertained by plotting the values of $x_1$, $y_1$, and $z_1$, for a series of chosen values of $\alpha$. Graphical methods of descriptive geometry are also usable involving laying out the cross-sections of the cutter in the various planes of $x$ constant and constructing the enveloping lines thereof. It is to be noted that Equations 6 and 7 give the generated surfaces only where they are actually envelopes of the cutter surface given by $f(U)$: i. e., the troughs of the passages generated by the final position of the cutter are surfaces of revolution of this cutter position.

While the generation has been described for the most general case, it will be obvious that it is equally applicable to the special cases of having either or both of $K_2$ or $n$ equal zero. If both are zero, the passages and vanes both conform strictly to $x = K_1 \tan b$. In all cases hyperboloidal, or substantially hyperboloidal cutters have been found most advantageous to secure properly shaped vanes.

In some instances, particularly where the angle between inlet and outlet measured about the axis is large, it will be found that a single generation by a cutter having a proper shape to form the desired vane taper will not suffice to give the desired trough as a part of the surface of revolution of the final cutter position. In such case recourse is had to the use of several cutters used successively and of such corresponding shapes that the proper vane shapes result from their successive operations. In each instance, however, the cutter is retracted as described for a predetermined part of the cutter action. The vane surfaces are then, except for the troughs, made up of a series of smoothly merging envelopes.

In Figures 10 and 11, there is shown a modified form of machine adapted particularly for rapid production of rotors, there being, however, less adjustability. This machine comprises a base 66 on which there is journalled about a horizontal axis 70 a work support 68 on which the blank to be cut is mounted as indicated in construction lines in the two figures. Secured to the support 68 and arranged to rock the same is an arm 72 provided with a guideway 74 in which there slides the cross-head 76 pivoted at 78 to a carriage 80 which is adapted to be moved along a horizontal trackway 84 by a screw 82 driven through change speed gearing 86 from a shaft 88 connected by bevel gearing 90 to the main shaft 92 of the machine.

The main shaft 92 of the machine drives through change speed gearing 94 a transverse horizontal screw 96 which engages a nut 100 carried by a carriage 98 whereby the carriage may be moved transversely along the tracks 93. This carriage in turn supports the spindle head 102 which is guided for longitudinal movement along the track 103 so as to provide movement of the cutter 106 mounted in the spindle 104 in the direction of its axis, the cutter being driven from a motor 108 carried by 102. To secure the axial movement of the cutter, bevel gearing 110, having a splined connection with a shaft 111 driven by change speed gearing 113 from the main shaft 92, is provided to drive an upright shaft 112 mounted in the carriage 98 which in turn drives through a bevel gear 114 a second bevel gear 116 fixed against axial movement and internally threaded to engage a screw 118 secured to the head 102. By reason of the change speed gearing and connections described, it will be evident that the cutter may be given predetermined axial and transverse horizontal movements while the cross-head 76 is moved horizontally in a direction parallel to the cutter axis by the screw 82.

Comparison of the last described machine with that of Figure 1 will reveal that the two machines are identical in operation, the last named machine being essentially the former turned through 90°. It will be obvious, therefore, that the theoretical considerations involved in Figures 5, 6, and 9 fully apply to the machine of Figures 10 and 11. It may be noted that, while in this last described machine, the length of the arm MN of Figure 5 is unchangeable, nevertheless, $K_1$ is variable by changing the gear ratio, for example at 86, it being pointed out above that $K_1$ is the product of the length of MN by the ratio of the rate of movement of $z$ to that of point M.

The machines of the type described may be utilized for the generation of turbine rotors or impellers. Turbine rotors generated thereby may take the general forms described particularly in my Patent 2,283,176.

In the case of impellers further important considerations are involved. So far, in connection with the generating machines, there have been considered only the vane surfaces and the troughs, produced by final cutter positions, without reference to the circumferential and axial boundaries of the impeller. These are of the greatest importance and there will now be considered these matters.

It may be noted, preliminarily, that by the use of these machines, and particularly that of Figure 1, which permits wide adjustment, a complete rotor of substantial axial length containing a number of impeller or turbine wheel stages, may be cut with no more than axial adjustment of the blank along the support 4 in the direction of the grooves 36. Such a combination rotor may be provided by assembling a group of forgings into a single unit, as indicated, for example, in my application Serial No. 443,957, filed May 21, 1942.

Referring first to the diagrammatic Figures 14 to 17, inclusive, there is indicated therein a rotor 122 adapted to rotate about an axis O'S' and having blading of the improved type of which one vane is indicated at 126 and of which an associated adjacent vane is indicated at 126'. In these diagrammatic figures, 126 and 126' represent theoretical vane surfaces upon which the physical vanes are constructed as described previously.

The theoretical vane surfaces may be provided in the form of portions of the doubly ruled surfaces described above or, alternatively, there may be some departure from said ruled surfaces, though, as pointed out, the departure, if any, should be relatively slight and, in fact, for ease of construction and machining, even such vane surface as would depart substantially from a single doubly ruled surface of the type indicated may be made up of a plurality of such surfaces. To simplify the discussion, however, there will first be described a vane surface built up from a doubly ruled surface, the actual used portion of the vane deviating substantially from the portion of the ruled surface used in accordance with the specific disclosure of said prior Patent 1,959,703.

As pointed out in said Patent 1,959,703, the doubly ruled surface involved conforms to an equation $x=K \tan b$, in which $x$ is measured along the axis of rotation, while $b$ is measured about said axis. It will be noted that this equation does not involve the coordinate $r$, i. e., the radial distance from the axis of rotation, consistent with the actual fact that one of the sets of straight lines making up the surface consists of radial lines. The other set of straight lines, as pointed out in said patent, are arranged in skew relationship to the axis of rotation in such fashion that each, if rotated about the axis, would trace out a hyperboloid of revolution.

Figure 17:
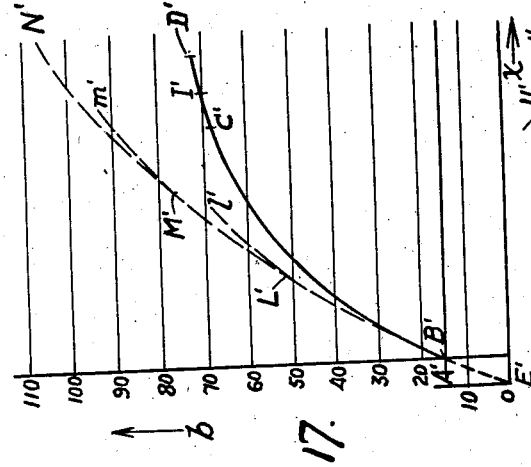
Figure 17 is a graph showing the relationship between angles about the axis of rotation and axial distances for vanes constructed in accordance with the invention.

Due to the absence of $r$ from the equation, it will be evident that any such surface may be completely defined (as a mathematical surface of infinite radial extent) by a single curve consisting of the angle $b$ plotted against axial distance $x$, as indicated in Figure 17, the ordinates of which are values of $b$ and the abscissas of which are values of $x$. Such a curve is plotted at E'A'D', the origin of measurement of both $b$ and $x$ being at the point E'. It will be obvious from the equation that this curve is a tangent curve having a point of inflection at the origin E' and, if produced, being asymptotic to $b=90°$ at infinity.

From the standpoint of the present design, the curve E'A'D' represents approximately one extreme design providing, as will be pointed out later, substantially a minimum angular difference between the inlet and outlet edges of the theoretical vane surface, and a straight line element D'D' of the surface defined by the curve E'A'D' in Figure 17 is chosen as the innermost element of the vane surface.

Figure 14:
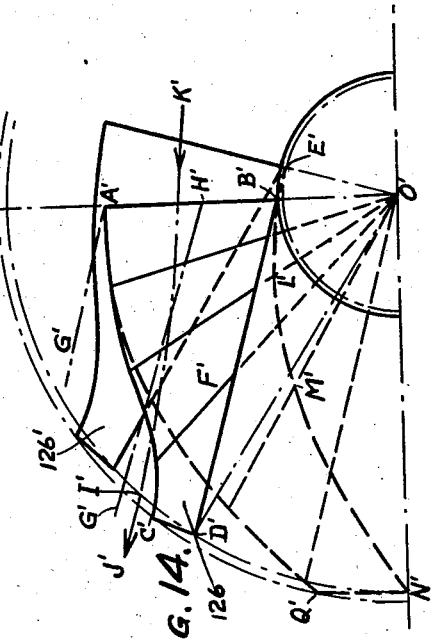
Figure 14 is a diagram showing in front elevation a pair of vane surfaces, together with certain allied matters indicating the fashion in which such vanes are laid out.

This straight line B'D' is shown as such in Figure 14. In the axial projection of that figure, it will appear as a straight line starting at a point B at the entrance edge of the vane which, in that figure, is indicated as the vertical line B'A'. This line, if continued, would have its closest approach to the axis O'P' at the point E', and as illustrative of the proper layout of this line, the angle B'O'E' is shown as approximately 15°. In the circumferential projection of Figure 16, the straight line E'B'D' will appear as one branch of a hyperbola, the closest approach to the axis of which will occur at E' in advance of the entrance edge of the vane, a which point the hyperbola is parallel with the axis O'P'.

Figure 16:
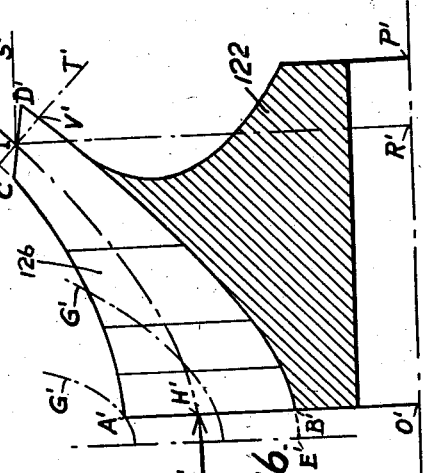
Figure 16 is a diagrammatic sectional view showing the vane and certain elements thereof and associated matters in the form of a circumferential projection about the axis of rotation into the plane of the paper.
Figure 15:
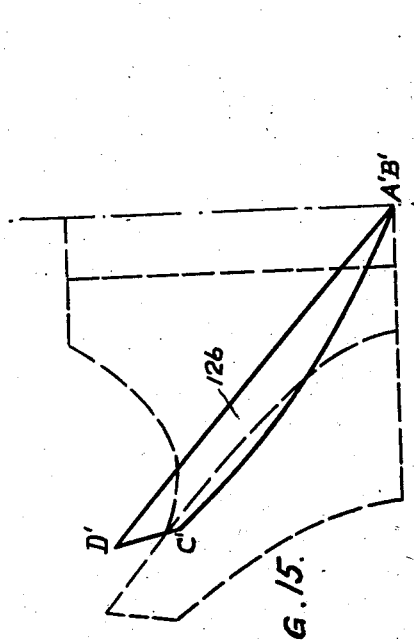
Figure 15 is a plan view of part of the matter of Figure 14 looking radially inwardly along the leading edge of a vane.

If further skew straight line elements of the surface defined by the curve E'A'D' in Figure 17 are plotted, they would appear as the straight lines G' of Figure 14 projecting into the hyperbolas G' of Figure 16. In accordance with the prior designs set forth in said patent, flow of the air was caused to take place approximately along one of such straight lines G' constituting approximately the center line of a vane between its inner and outer boundary edges. For example, with an entrance edge A'B' as indicated in Figure 16, the vane would be designed to extend approximately equal distances on opposite sides of the inner line G' indicated in Figures 14 and 16. In accordance with the present invention, however, the flow path except along the innermost portion of the vane where it coincides fairly closely with the straight line element B'D' (subject to the trough formation of Figure 7) departs quite substantially from the other skew straight line elements of the surface, and the vane is chosen from that part of the surface $x=K \tan b$ indicated at A'B'D'C', where A'B' is the inlet edge, C'D' is the outlet edge and B'D' and A'C' are, respectively, the inner and outer boundaries of the vane. By reason of this selection of the vane surface, there is obtained for a given axial and radial extent of the vane a very substantial angular difference between the inlet edge A'B' and the outlet edge C'D'. As will be evident from Figure 17, in the example illustrated the angular distance between B' (or A') and D', is about 56.6°, and the angular distance between the entrance edge A'B' and the center I' of the outlet edge C'D' is about 55°. It will be evident that to obtain such an angular difference between the entrance and exit portions of the vane, if the vane was caused to follow, for example, the inner straight line element G', the diameter of the impeller would have to be very much greater.

As a result of the improved design, the specific loading of the vanes is kept down to such extent that, during operation, the flow is gradually deviated from its entrance direction without production of burbling, and hence smooth flow at very high speeds of operation may be secured.

As a result of the fact that the improved vane 126 is a portion of the theoretical doubly ruled surface, it consists throughout of radial straight line elements F′ giving a maximum strength against centrifugal stresses arising at very high speeds of rotation.

The angles along the inlet edge vary in proper fashion with the radius, as described in said patent in such fashion that if $n$ is the inlet angle at a radius $r$, $$\tan n = \frac{K \sec^2 b'}{r}$$

where $b'$ is the constant value of $b$ corresponding to the leading element. Thus the flow of gas into the impeller passages at the inlet edges of the vanes takes place smoothly without shock throughout its radial extent. While, in the case illustrated, the angle $b'$ is shown as approximately 15°, this angle is subject to substantial variation subject to the general limitations that it should be small to obtain a maximum angle between the inlet and outlet of the impeller but not so small as to create machining difficulties or give rise to an entrance portion of each passage which contributes little to the acceleration of the fluid.

If sections are taken across the space between adjacent vanes such as 126 and 126′ perpendicular to the flow through such space, it will be evident that at the inlet the section will have a trapezoidal shape due to the radial divergence from each other of the inlet portions of the adjacent vanes, while at the outlet the section will also be trapezoidal but with a substantial change of proportions, the trapezoid here being substantially reduced in an outward direction while being of substantially greater extent circumferentially, approaching more nearly a parallelogram. If a line be drawn through the centers of gravity of these sections, such line will appear about as indicated at H′I′, and it will be apparent from the figures that this line, representing what might be called a mean path of flow, involves only gradual curvature, having at no point thereof any small radius of curvature. As a result of such flow patch, at no point thereof is there any great curvature of the flow, meaning essentially that the loading of the passage causing acceleration of the gas is relatively uniform throughout to the end that all parts of the passage contribute to the acceleration without there being set up such forces as would result in burbling. At the point H′ the entrance occurs very nearly axially, as indicated by the vector K′, while at the exit point I′ (which is approximately, in the projection of Figure 5, both the center of the exit edge C′D′ of each vane and the center of gravity of the cross-section of the flow) the flow takes place in the direction indicated by the arrow J′ in Figures 14 and 16.

As indicated above, the design just described approaches one extreme of desirable design for high speed operation, and it is, in fact, desirable to secure an even greater change of the angle $b$ between the inlet and outlet edges. For example, for the same capacity of the impeller and for the same speed of rotation, it would be desirable to secure a difference of angle between the entrance and exit of 90° or more, and for this purpose the surface, consisting of straight line radial elements, might be as indicated at A′N′ (or B′N′) in Figure 17. Such a surface, it will be noted, would give a change of 90° between the entrance edge and the extreme limit of the exit edge. In the circumferential projection, a surface formed in this fashion would appear identically the same as the surface A′B′D′C′ described previously, whereas in the axial projection of Figure 14 the surface would appear as indicated at A′B′N′Q′, i. e., extended considerably more than the surface A′B′D′C′ about the axis of rotation within, however, the same radial and axial confines. For the same capacity and speed of rotation, it is evident that such a surface would be tangent to the surface A′B′D′C′ along the entrance edge A′B′, and as a result of such tangency, the same variation of inlet angle with radius would be secured as described previously, so that shockless entrance along the entire leading edge would take place.

A surface of such greater angular extent can be satisfactorily provided so long as it contains radial straight line elements, even though it does not contain throughout its extent, and, in fact, cannot contain, a single set of skew straight lines, and such a surface may be cast or machined by successive cuts of a milling cutter as above described or by the use of a radially arranged milling cutter, as will be obvious to those skilled in the art. Such an angularly extended surface, however, may be desirably made up of a series of surfaces $x = K \tan b$ having different constants $K$ and different origins for the measurement of $b$ and $x$, and, for convenience of construction, the rotor may be made in a plurality of parts secured together and each provided with partial vane surfaces conforming to the different variants of the equation. For example, as indicated in Figure 17, the entire surface A′N′ may be made up of the parts A′L′, L′M′ and M′N′, each of which may conform to the formula. A′L′, for example, may be made in the form of such a surface tangent to A′D′ at A′ carried to the point L′. (For the surface A′L′, of course, the origin is no longer at E′, and K will have a different value from that defining A′D′.) If such a surface was continued further, however, it would tend to turn in an axial direction, as viewed in Figure 17, as indicated by the continuation marked $l'$. It therefore becomes necessary at L′ to provide a different surface L′M′, which also will have a different K and a different origin. As before, this surface may not reach the location N′ by reason of axial deviation, as indicated at $m'$, so that a third surface may be provided at M′ extending through N′. It will be evident from the nature of the equation for these doubly ruled surfaces that tangency may be secured throughout the entire radial extent of the surfaces at L′ and M′ so that a completely smooth composite surface results. While the flow path, as viewed in an axial projection such as Figure 14, will, in the case of such a surface, appear more curved than the path H′I′ previously described, it will be evident that, as a matter of fact, the curvature it imparts to the gas will be even less, so that the specific loading of the vanes will be even further reduced. In other words, it effects the same resulting acceleration of the gas, but the work done in accomplishing this is distributed over a much more extended vane surface. While there is an actual increase in the "wetted" surfaces of such vanes, the fact that an even more gradual acceleration takes place results in less tendency to produce any burbling condition resulting from breaking of the flow away from the passage walls and the disadvantage of slightly increased friction losses is paid for by a substantial net increase in efficiency.

The various relative dimensions involved in accordance with the invention are not critical within substantial ranges. For example, the change of the angle $b$ from the inlet edge of a vane to the center of the outlet edge may vary from a lower limit of about 35° through upwards of 100°. Desirably, however, this angle should be at least 45° and most desirably lies within a range of about 55° to 85°. The most desirable portions of the ranges indicated are dictated by the speeds of operation, i. e., smaller angular changes are consistent with lower speeds, while for higher speeds the angles should be within the upper portions of the ranges.

In the circumferential projection of Figure 5, the angle made by the projection of the discharge vector J' with the axis (i. e., the angle J'I'S') should lie within about the range 35° to 60°. The backward angle made by this vector with respect to the tangent to the circumferential direction at I' measured within a plane containing both the tangent and the vector J' should be between about 40° and 85°.

The inlet angle at the outermost portion of the inlet edge, i. e., the angle $n$, should lie between the limits of about 20° and 45°, this angle inwardly thereof varying according to the expression above set forth.

The blade height at the inlet edge, i. e., A'B', should be between about 0.5 and 0.7 of A'O', the eye radius.

The axial length of the mean flow path, i. e., O'R' should be between about 0.7 and 1.2 of the eye radius A'O'.

The radius I'R' (of the exit edge) should be between about 1.0 and 1.5 of A'O', the eye radius, and preferably between about 1.2 and 1.4 of A'O'.

It will be noted that the outlet edge C'D' is not illustrated as perpendicular to the mean flow path, and generally speaking its circumferential projection will make a small angle with respect to the axis of rotation about as illustrated, generally about 8° to 10°. It is found that such an angle is desirable in order that the impeller will impart the same amount of energy to each particle of air irrespective of its flow path within the radial limits of the passage. This results in the same pressure at all points of the discharge. If pressure differences are permitted to occur disturbances are set up with energy losses. If a conical surface is constructed about the axis of rotation perpendicular to the mean flow path, in its circumferential projection, at I', which conical surface is indicated at U'T' in Figure 16, the conical annulus U'V' may be considered as the virtual area through which the discharge takes place. This conical annulus is related to the plane annulus about the center of rotation and bounded by circle through A' and B', respectively, which annulus may be called the entrance annulus, in such fashion that the ratio of the area of the conical annulus to the area of this entrance annulus is about 0.6 to 0.9, which is a result of the fact that the ratio of the meridian velocities normal to these annuli should be approximately unity. The ratio of inlet volume flow to the entrance annulus should be equal to the ratio of the discharge volume flow to the area of the conical discharge annulus, and the design as just indicated gives this result.

The outer boundary A'C' and the inner boundary B'D' of each of the vanes may be rather arbitrarily chosen within limits. It is not required, as was assumed in the laying out of the blade 126, that the line B'D' should be a straight line, projecting circumferentially into an hyperbola. The boundary B'D' is, in fact, in the case of vane surface generation as described above, merely an incident of the cutter shape and its innermost position. Generally speaking, the spacing of these boundaries inwardly and outwardly of the mean flow path H'I' is such that for a smooth path H'I', which is also to a degree arbitrary, the cross-sections of the impeller passages perpendicular to this flow path have their centers of gravity lying approximately along the path H'I'. The areas of the cross-sections of the impeller passages perpendicular to this flow path gradually increase from the inlet to the outlet to secure a small equivalent cone angle (i. e., double the angle between the cone axis and a straight line element), of the order, for example, of 2° to 6° (and preferably about 4°) defining the equivalent cone (as is conventional in impeller design practice) as one of which a frustum, having the discharge area as its base and the inlet area as its top, has as its height the developed length of the flow path between these areas. In the present case, this height is very long for a given impeller diameter, so that a small proper cone angle results in a large, desirable area ratio. As is well known from aerodynamics, however, so long as flow paths do not have sharp deviations or divergences when viewed in the light of flow velocities, it will be evident that substantial latitude in the design of the impeller passages is permissible even with very high flow velocities and rotational speeds consistent with the avoidance of burbling. The equivalent cone angle may, in fact, be slightly negative.

The number of vanes about the circumference of the impeller is subject to substantial variation, though desirably this number should lie between 17 and 27, 21 to 23 vanes being the optimum number. The considerations determining the proper number of vanes are those of proper guidance of the flow balanced against the introduction of too great a total wall area giving rise to excessive friction. If at least 17 vanes are used, good guidance of the flow results, i. e., there is no such great spacing between the vanes as will permit any portions of the flow to depart substantially from parallelism in a three-dimensional sense, with the vanes. With increase of the number of vanes up to 21 to 23, still better guidance results and above this number the guidance is not materially improved, so that if the number of vanes rises above about 25, friction losses begin to enter into the picture to lower the efficiency.

The theoretical surfaces of the type described may be considered as those upon which actual vanes are constructed, i. e., such surfaces are desirably the central surfaces of symmetry of the vanes. As a consequency, the passages between the vanes may also be said to have substantially such surfaces as their boundaries, or these passages may be regarded as built up of imaginary laminae formed by such surfaces and extending parallel to the flow through the passages. For mechanical strength, the actual vanes are desirably strictly radial, though some slight departure therefrom may be tolerated if necessitated by special design requirements as indicated above in the discussion of Figure 7. Generally speaking, the thickness of each vane along its entire outer contour should be no more than one-half the thickness at its base where it joins the impeller hub, the vanes desirably tapering, as indicated most clearly in Figure 12. The vanes may be formed by milling out a solid blank of metal, as indicated above, in which case it is desirable to provide large fillets where the vane joins the hub proper.

Figure 13:
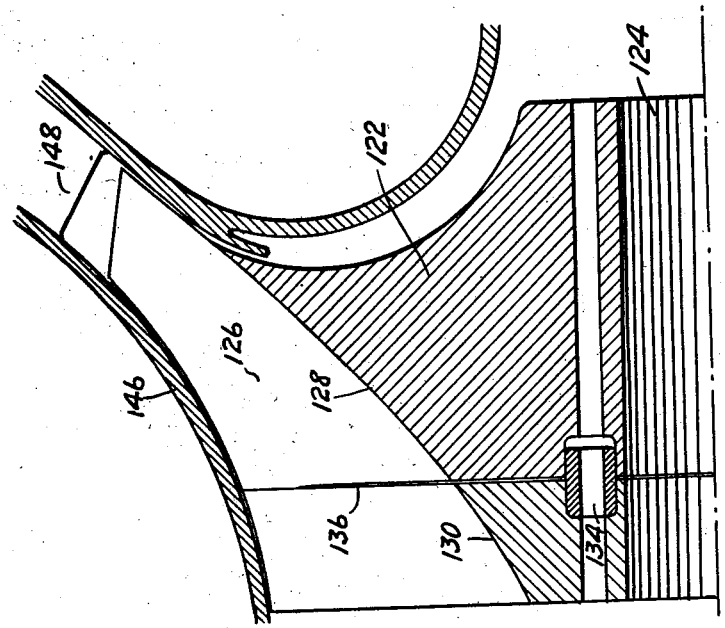
Figure 13 is an axial section showing part of an impeller of the improved type together with a portion of its associated housing.
Figure 12:
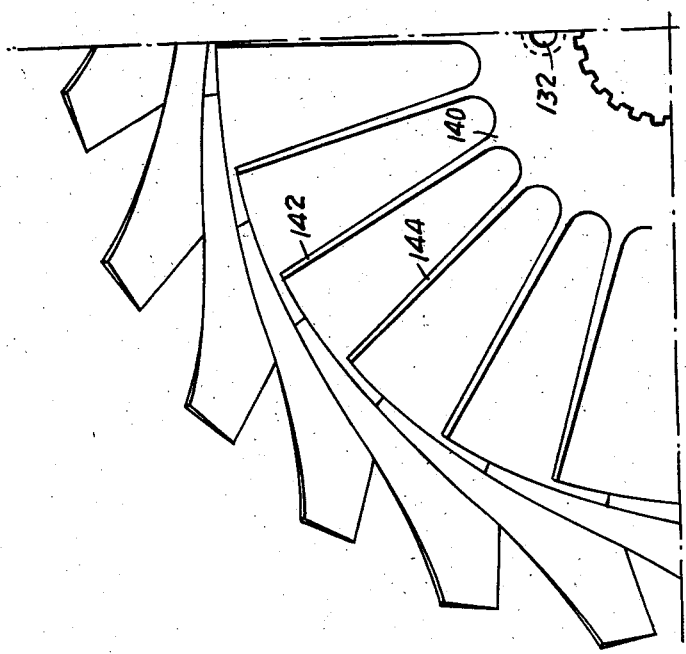
Figure 12 is a fragmentary elevation of the entrance side of an impeller of the improved design.

The embodiment of the invention in an actual impeller will be clear from a consideration of Figures 12 and 13. Either for reasons of machining described above, i. e., to form a quite extended vane surface by milling separate doubly ruled surfaces, or for the damping of vibration as described in my application Serial No. 407,408, filed August 19, 1941, the impeller may be made in a plurality of sections. In the instance illustrated in Figures 12 and 13, the impeller is made up of two sections 128 and 130, respectively, provided with aligned holes 132 in enlarged portions of which are located bushings 134 arranged to align accurately the sections with respect to each other. The holes accommodate alloy expansion rods controlling the sliding of the impeller on its shaft to maintain constant the clearances between the impeller and its housing under all temperature conditions. The two impeller halves are held together by the pressure differences across the impeller, section 130 being located by means of the heads of the expansible rods. As illustrated in Figure 13, there is a slight undercut 136 of one hub section and the inner portions of its vanes where they abut the other hub section, so that when the two sections are pressed together, the vane sections engage each other tightly at their outermost portions. This serves to effect damping of vibrations which may be set up during operation. In order further to align the impeller sections, and associate them with other impellers in a multiple stage arrangement, and to provide for bearing support, the bore 124 in the hub is provided with internal teeth 138 adapted to be engaged with corresponding spline teeth on a tubular shaft, not shown. The taper of the vanes will be apparent from considering the base portions 140 thereof and the outermost portions 142. The entrance edges 144 are desirably rounded to provide airfoil action. If such airfoil edges are provided, there is very little change in efficiency from the standpoint of losses at the intake edges of the vanes over a moderate variation in the ratio of the volume of gas handled by the impeller to the speed of rotation despite the fact that this ratio may deviate to such an extent that the entrance angles along the inlet edges are no longer strictly proper to secure shockless entrance. This is due to the fact that an airfoil edge will provide smooth flow for substantial changes of angle. Thus an impeller so constructed is adapted for efficient operation for variations of the ratio of the volume handled to speed between the limits of pulsation and maximum capacity.

The exit edges of the vanes are also desirably tapered down to form good trailing airfoil edges. Conditions in this region, however, are not so important inasmuch as the impeller outlet velocities relative to the vanes are substantially smaller than the impeller entrance velocities relative to the inlet edges of the vanes.

Impellers designed in accordance with the foregoing are enclosed in suitable conventional housings 146 and discharge into suitable diffusers 148 designed properly to receive the gas at its high speed of flow.

It is to be noted that the dimensional matters last described are applicable to the construction of all impellers the vane surfaces of which are generated by the mechanisms heretofore described with particular reference to Figures 5, 6, 7, and 9. As pointed out above, the theoretical surfaces on which the vanes may be regarded as constructed may be, despite their precise formulae indicated above, regarded as made up of a series of simple surfaces in accordance with Figure 17, the other surfaces being close approximations to a series of such surfaces.

The various relative dimensional matters are tied up with performance to secure various desirable features.

First is the matter of efficiency which may be defined as the work required theoretically for adiabatic compression divided by the actual work required to accomplish it. This involves the avoidance of inlet shock, the avoidance of breakage of the flow from the walls which would be attended with the production of turbulence and eddies, the avoidance of crowding of flow in a passage toward some wall thereof, and the use of a proper number of vanes to secure effective guidance of flow.

A second criterion is the securing of the highest possible efficiencies for high pressure ratios corresponding to high tip speeds.

The third criterion is that of securing a useful broad operating range of air flow handled by the impeller at constant speed.

A fourth criterion is the securing of a maximum capacity for the size of the wheel, a small size meaning a minimum wetted surface and, therefore, less friction loss and also minimum bulk and weight, the latter being particularly important in aircraft applications.

A fifth criterion involves the securing of a proper variation of capacity with the speed.

These criteria are satisfied by the constructions heretofore described. Avoidance of inlet shock is provided by a proper variation of the inlet angle and proper values to suit the speed and volume handled. Breakage of flow from the walls of the impeller vanes is prevented by a large change of the angle $b$ from inlet to outlet and a large ratio of O'R' to A'O'. Axial crowding at the outlet is prevented by a large ratio of O'R' to A'O' and a small ratio of I'R' to A'O'. Increase of the number of vanes lessens the divergence angle and therefore provides smooth flow. The proper angle of the outlet C'D' also contributes to the efficiency. High efficiency results from a large change of the angle $b$ between inlet and outlet, a large ratio of O'R' to A'O' and a small cross-section at the outlet corresponding to a cone angle which may be small or which may even be negative. A small true discharge angle increases the operating range. Small size involves a small ratio of I'R' to A'O'. The variation of capacity with speed is controlled by the inlet angle, and a large inlet angle is desirable for high speeds.

What I claim is:

1. A rotor having passages therein for elastic fluid, each passage conforming substantially to a surface having the parametric equations:

$$y = \frac{x}{\tan(\alpha+M)} - \frac{p}{\sin(\alpha+M)} - n$$

and $$z = K_1\left(\frac{1}{\tan \alpha} - K_2\right)$$

2. A rotor having passages therein for elastic fluid, each passage conforming substantially to a surface having the parametric equations:

$$y = \frac{x}{\tan \alpha} - \frac{p}{\sin \alpha} - n$$

and $$z = K_1\left(\frac{1}{\tan \alpha} - K_2\right)$$

3. A rotor having passages therein for elastic fluid, each passage conforming substantially to a surface having the parametric equations:

$$y = \frac{x}{\tan \alpha} - n$$

and $$z = K_1\left(\frac{1}{\tan \alpha} - K_2\right)$$

4. A rotor having passages therein for elastic fluid, each passage conforming substantially to a surface having the parametric equations:

$$y = \frac{x}{\tan \alpha}$$

and $$z = K_1\left(\frac{1}{\tan \alpha} - K_2\right)$$

5. An impeller having passages therein for elastic fluid, each passage conforming substantially to a surface having the parametric equations:

$$y = \frac{x}{\tan \alpha} - n$$

and $$z = K_1\left(\frac{1}{\tan \alpha} - K_2\right)$$

$n - K_2 x$ being positive at the inlet and $n - K_2 x$ being negative at the outlet of said passages.

6. An impeller having passages therein for elastic fluid, each passage conforming substantially to a surface having the parametric equations:

$$y = \frac{x}{\tan \alpha}$$

$$z = K_1\left(\frac{1}{\tan \alpha} - K_2\right)$$

7. An impeller having passages therein for elastic fluid, each passage conforming substantially to a surface having the parametric equations:

$$y = \frac{x}{\tan \alpha} - n$$

and $$z = K_1\left(\frac{1}{\tan \alpha} - K_2\right)$$

$n - K_2 x$ being positive at the inlet and $n - K_2 x$ being negative at the outlet of said passages, said passages being bounded by tapering vanes each of which encompasses substantially all radial lines extending inwardly from points thereof.

8. A rotor having passages therein for elastic fluid, each passage conforming substantially to a surface having the parametric equations:

$$y = \frac{x}{\tan \alpha}$$

$$z = K_1\left(\frac{1}{\tan \alpha} - K_2\right)$$

said passages being bounded by tapering vanes each of which encompasses substantially all radial lines extending inwardly from points thereof.

9. An impeller for a centrifugal compressor having vanes defining passages for elastic fluid and extending in skew relationship to the axis of rotation, each of said vanes extending substantially along radial lines, and having its exit portion spaced from its inlet portion by an angle about the axis of rotation substantially within the range of 35° to 100°, each passage guiding the flow across the skew straight lines of at least one surface having the equation $x = K \tan b$ and approximating a radial median surface through the passage, $x$ in said equation being measured along, and $b$ about, the axis of rotation.

10. An impeller for a centrifugal compressor having vanes defining passages for elastic fluid and extending in skew relationship to the axis of rotation, each of said vanes extending substantially along radial lines, having its inlet edge of a radial extent measuring substantially between 0.5 and 0.7 times the maximum radius of the inlet edge, having a mean axial extent measuring substantially between 0.7 and 1.2 times the maximum radius of the inlet edge, and having the mean radius of its outlet edge measuring substantially between 1.0 and 1.5 times the maximum radius of the inlet edge, each passage guiding the flow across the skew straight lines of at least one surface having the equation $x = K \tan b$ and approximating a radial median surface through the passage, $x$ in said equation being measured along, and $b$ about, the axis of rotation.

11. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, having the tangent of the inlet angle along its inlet edge varying substantially in inverse proportion to the radial distance from the axis of rotation, having the value of the inlet angle at the outermost portion of the inlet edge substantially in the range 20° to 45°, having its inlet edge of a radial extent measuring substantially between 0.5 and 0.7 times the maximum radius of the inlet edge, having a mean axial extent measuring substantially between 0.7 and 1.2 times the maximum radius of the inlet edge, and having the mean radius of its outlet edge measuring substantially between 1.0 and 1.5 times the maximum radius of the inlet edge, said vanes numbering 17 to 27, each passage guiding the flow across the skew straight lines of at least one surface having the equation $x = K \tan b$ and approximating a radial median surface through the passage, $x$ in said equation being measured along, and $b$ about, the axis of rotation.

12. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, and having the tangent of the inlet angle along its inlet edge varying substantially in inverse proportion to the radial distance from the axis of rotation, each passage guiding the flow across the skew straight lines of at least one surface having the equation $x = K \tan b$ and approximating a radial median surface through the passage, $x$ in said equation being measured along, and $b$ about, the axis of rotation.

13. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, having the tangent of the inlet angle along its inlet edge varying substantially in inverse proportion to the radial distance from the axis of rotation, and having the value of the inlet angle at the outermost portion of the inlet edge substantially in the range 20° to 45°, each passage guiding the flow across the skew straight lines of at least one surface having the equation $x=K\tan b$ and approximating a radial median surface through the passage, $x$ in said equation being measured along, and $b$ about, the axis of rotation.

14. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, and having its inlet edge of a radial extent measuring substantially between 0.5 and 0.7 times the maximum radius of the inlet edge, each passage guiding the flow across the skew straight lines of at least one surface having the equation $x=K\tan b$ and approximating a radial median surface through the passage, $x$ in said equation being measured along, and $b$ about, the axis of rotation.

15. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, having its inlet edge of a radial extent measuring substantially between 0.5 and 0.7 times the maximum radius of the inlet edge, and having the mean radius of its edge measuring substantially between 1.0 and 1.5 times the maximum radius of the inlet edge, each passage guiding the flow across the skew straight lines of at least one surface having the equation $x=K\tan b$ and approximating a radial median surface through the passage, $x$ in said equation being measured along, and $b$ about, the axis of rotation 16. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, and said vanes numbering 17 to 27, each passage guiding the flow across the skew straight lines of at least one surface having the equation $x=K\tan b$ and approximating a radial median surface through the passage, $x$ in said equation being measured along, and $b$ about, the axis for rotation.

17. An impeller for a centrifugal compressor having vanes defining passages for elastic fluid and extending in skew relationship to the axis of rotation, each of said vanes extending substantially along radial lines, having its inlet edge of a radial extent measuring substantially between 0.5 and 0.7 times the maximum radius of the inlet edge, having a mean axial extent measuring substantially between 0.7 and 1.2 times the maximum radius of the inlet edge, having the mean radius of its outlet edge measuring substantially between 1.0 and 1.5 times the maximum radius of the inlet edge, and said vanes numbering 17 to 27, each passage guiding the flow across the skew straight lines of at least one surface having the equation $x=K\tan b$ and approximating a radial median surface through the passage, $x$ in said equation being measured along, and $b$ about, the axis of rotation.

18. An impeller for a centrifugal compressor having vanes defining passages for elastic fluid and extending in skew relationship to the axis of rotation, each of said vanes extending substantially along radial lines, having its inlet edge of a radial extent measuring substantially between 0.5 and 0.7 times the maximum radius of the inlet edge, having a mean axial extent measuring substantially between 0.7 and 1.2 times the maximum radius of the inlet edge, having the mean radius of its outlet edge measuring substantially between 1.0 and 1.5 times the maximum radius of the inlet edge, and the passages defined by said vanes having gradually increasing cross-sections normal to the paths of flow therethrough, each passage guiding the flow across the skew straight lines of at least one surface having the equation $x=K\tan b$ and approximating a radial median surface through the passage, $x$ in said equation being measured along, and $b$ about, the axis of rotation.

19. An impeller for a centrifugal compressor having vanes defining passages for elastic fluid and extending in skew relationship to the axis of rotation, each of said vanes extending substantially along radial lines, having its inlet edge of a radial extent measuring substantially between 0.5 and 0.7 times the maximum radius of the inlet edge, having a mean axial extent measuring substantially between 0.7 and 1.2 times the maximum radius of the inlet edge, having the mean radius of its outlet edge measuring substantially between 1.0 and 1.5 times the maximum radius of the inlet edge, and the annular area through which discharge takes place from said passages being substantially 0.6 to 0.9 times the annular area through which flow enters said passages, each passage guiding the flow across the skew straight lines of at least one surface having the equation $x=K\tan b$ and approximating a radial median surface through the passage, $x$ in said equation being measured along, and $b$ about, the axis of rotation.

20. An impeller for a centrifugal compressor having vanes defining passages for elastic fluid and extending in skew relationship to the axis of rotation, each of said vanes extending substantially along radial lines, having its inlet edge of a radial extent measuring substantially between 0.5 and 0.7 times the maximum radius of the inlet edge, having a mean axial extent measuring substantially between 0.7 and 1.2 times the maximum radius of the inlet edge, and having the mean radius of its outlet edge measuring substantially between 1.0 and 1.5 times the maximum radius of the inlet edge, the angle between the circumferential projection of the direction of discharge from said passages and the axis of rotation being substantially 35° to 60°, each passage guiding the flow across the skew straight lines of at least one surface having the equation $x = K \tan b$ and approximating a radial median surface through the passage, $x$ in said equation being measured along, and $b$ about, the axis of rotation.

21. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, the passages defined by said vanes having gradually increasing cross-sections normal to the paths of flow therethrough, each passage guiding the flow across the skew straight lines of at least one surface having the equation $x = K \tan b$ and approximating a radial median surface through the passage, $x$ in said equation being measured along, and $b$ about, the axis of rotation.

22. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, the annular area through which discharge takes place from said passages being substantially 0.6 to 0.9 times the annular area through which flow enters said passages, each passage guiding the flow across the skew straight lines of at least one surface having the equation $x = K \tan b$ and approximating a radial median surface through the passage, $x$ in said equation being measured along, and $b$ about, the axis of rotation.

23. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, the angle between the circumferential projection of the direction of discharge from said passages and the axis of rotation being substantially 35° to 60°, each passage guiding the flow across the skew straight lines of at least one surface having the equation $x = K \tan b$ and approximating a radial median surface through the passage, $x$ in said equation being measured along, and $b$ about, the axis of rotation.

24. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, having an airfoil inlet edge, and tapering outwardly so that its outermost portions are no thicker than one-half the thickness of its radially corresponding base portions, each passage guiding the flow across the skew straight lines of at least one surface having the equation $x = K \tan b$ and approximating a radial median surface through the passage, $x$ in said equation being measured along, and $b$ about, the axis of rotation.

25. An impeller for a centrifugal compressor having vanes defining passages for elastic fluid and extending in skew relationship to the axis of rotation, each of said vanes extending substantially along radial lines, having its exit portion spaced from its inlet portion by an angle about the axis of rotation substantially within the range of 35° to 100°, having the tangent of the inlet angle along its inlet edge varying substantially in inverse porportion to the radial distance from the axis of rotation, having the value of the inlet angle at the outermost portion of the inlet edge substantially in the range 20° to 45°, having an airfoil inlet edge, and tapering outwardly so that the outermost portions are no thicker than one-half the thickness of its radially corresponding base portions, each passage guiding the flow across the skew straight lines of at least one surface having the equation $x = K \tan b$ and approximating a radial median surface through the passage, $x$ in said equation being measured along, and $b$ about, the axis of rotation.

26. An impeller for a centrifugal compressor having vanes defining passages for elastic fluid and extending in skew relationship to the axis of rotation, each of said vanes extending substantially along radial lines, having the mean radius of its outlet edge measuring substantially between 1.0 and 1.5 times the maximum radius of the inlet edge, the passage defined by said vanes having gradually increasing cross-sections normal to the paths of flow therethrough, and the annular area through which discharge takes place from said passages being substantially 0.6 to 0.9 times the annular area through which flow enters said passages, each passage guiding the flow across the skew straight lines of at least one surface having the equation $x = K \tan b$ and approximating a radial median surface through the passage, $x$ in said equation being measured along, and $b$ about, the axis of rotation.

RUDOLPH BIRMANN.